(12) United States Patent
Okabe et al.

(10) Patent No.: US 12,175,997 B2
(45) Date of Patent: Dec. 24, 2024

(54) INFORMATION PROCESSING DEVICE, WEARABLE DEVICE, INFORMATION PROCESSING METHOD, AND STORAGE MEDIUM

(71) Applicant: NEC Corporation, Tokyo (JP)

(72) Inventors: Koji Okabe, Tokyo (JP); Takayuki Arakawa, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 602 days.

(21) Appl. No.: 17/421,512

(22) PCT Filed: Jan. 7, 2020

(86) PCT No.: PCT/JP2020/000195
§ 371 (c)(1),
(2) Date: Jul. 8, 2021

(87) PCT Pub. No.: WO2020/149175
PCT Pub. Date: Jul. 23, 2020

(65) Prior Publication Data
US 2022/0093120 A1    Mar. 24, 2022

(30) Foreign Application Priority Data
Jan. 15, 2019    (JP) .................................. 2019-004003

(51) Int. Cl.
*G10L 25/51* (2013.01)
*G06F 21/32* (2013.01)
(Continued)

(52) U.S. Cl.
CPC .............. *G10L 25/51* (2013.01); *G06F 21/32* (2013.01); *G10K 11/17873* (2018.01);
(Continued)

(58) Field of Classification Search
USPC ........................ 704/246, 247, 251, 252, 275
See application file for complete search history.

(56) References Cited

U.S. PATENT DOCUMENTS

2010/0328033 A1    12/2010  Kamei
2011/0314530 A1*   12/2011  Donaldson ............ H04L 9/3231
                                                              726/7

(Continued)

FOREIGN PATENT DOCUMENTS

JP    H11331990 A    11/1999
JP    2002221990 A    8/2002
(Continued)

OTHER PUBLICATIONS

Extended European Search Report for EP Application No. EP20740784.2 dated on Feb. 11, 2022.
(Continued)

Primary Examiner — Leonard Saint-Cyr
(74) Attorney, Agent, or Firm — Sughrue Mion, PLLC (57) ABSTRACT

Provided is a first acoustic information acquisition unit configured to acquire a first acoustic information obtained by receiving a sound wave emitted from a first sound source by a wearable device worn by a user, a second acoustic information acquisition unit configured to acquire a second acoustic information obtained by receiving a sound wave emitted from a second sound source that is different from the first sound source by the wearable device, and a third acoustic information acquisition unit configured to acquire a third acoustic information used for biometric matching of the user based on the first acoustic information and the second acoustic information.

14 Claims, 9 Drawing Sheets

(51) Int. Cl.
*G10K 11/178* (2006.01)
*G10L 17/06* (2013.01)
*H04R 1/10* (2006.01)
*H04R 1/40* (2006.01)
*H04R 3/00* (2006.01)

(52) U.S. Cl.
CPC ............ *G10L 17/06* (2013.01); *H04R 1/1008* (2013.01); *H04R 1/406* (2013.01); *H04R 3/005* (2013.01); *G10K 2210/3027* (2013.01)

(56) References Cited

U.S. PATENT DOCUMENTS

| | | | |
|---|---|---|---|
| 2018/0096120 A1 | 4/2018 | Boesen | |
| 2018/0115818 A1* | 4/2018 | Asada | G10K 11/17881 |
| 2018/0307818 A1 | 10/2018 | Yano et al. | |
| 2019/0012448 A1 | 1/2019 | Lesso | |
| 2019/0189129 A1 | 6/2019 | Arakawa et al. | |
| 2020/0184057 A1* | 6/2020 | Mukund | G06F 21/44 |
| 2021/0103646 A1* | 4/2021 | Koshinaka | H04R 1/08 |

FOREIGN PATENT DOCUMENTS

| | | |
|---|---|---|
| JP | 2004065363 A | 3/2004 |
| JP | 2005184386 A | 7/2005 |
| JP | 2015206857 A | 11/2015 |
| WO | 2008/015956 A1 | 2/2008 |
| WO | 2009104437 A1 | 6/2011 |
| WO | 2018034178 A1 | 2/2018 |
| WO | 2017069118 A1 | 9/2018 |
| WO | 2018/213746 A1 | 11/2018 |

OTHER PUBLICATIONS

International Search Report for PCT Application No. PCT/JP2020/000195, mailed on Mar. 24, 2020.
English translation of Written opinion for PCT Application No. PCT/JP2020/000195, mailed on Mar. 24, 2020.

\* cited by examiner

INFORMATION PROCESSING DEVICE, WEARABLE DEVICE, INFORMATION PROCESSING METHOD, AND STORAGE MEDIUM

This application is a national stage entry of PCT/JP2020/000195 filed on Jan. 7, 2020, which claims priority from Japanese patent application 2019-004003 filed on Jan. 15, 2019, the contents of all of which are incorporated herein by reference, in their entirety.

TECHNICAL FIELD

The disclosure relates to an information processing device, a wearable device, an information processing method, and a storage medium.

BACKGROUND ART

Patent Literature 1 discloses a headphone having a personal authentication function. Patent Literature 1 further discloses, as an example of the personal authentication function, a method for determining a person based on acoustic characteristics inside the ear.

CITATION LIST

Patent Literature

PTL 1: Japanese Patent Application Laid-open No. 2004-65363

SUMMARY OF INVENTION

Technical Problem

Acoustic characteristics acquired by a wearable device as described in Patent Literature 1 may change depending on the wearing state. Thus, differences in the wearing states may affect the accuracy of the matching based on acoustic characteristics.

The disclosure intends to provide an information processing device, a wearable device, an information processing method, and a storage medium which can improve the accuracy of a biometric matching using acoustic information acquired by the wearable device.

Solution to Problem

According to one example aspect of the invention, provided is an information processing device including a first acoustic information acquisition unit configured to acquire a first acoustic information obtained by receiving a sound wave emitted from a first sound source by a wearable device worn by a user, a second acoustic information acquisition unit configured to acquire a second acoustic information obtained by receiving a sound wave emitted from a second sound source that is different from the first sound source by the wearable device and a third acoustic information acquisition unit configured to acquire a third acoustic information used for biometric matching of the user based on the first acoustic information and the second acoustic information.

According to another example aspect of the invention, provided is a wearable device including a first acoustic information acquisition unit configured to acquire a first acoustic information obtained by receiving a sound wave emitted from a first sound source by the wearable device worn by a user, a second acoustic information acquisition unit configured to acquire a second acoustic information obtained by receiving a sound wave emitted from a second sound source that is different from the first sound source by the wearable device, and a third acoustic information acquisition unit configured to acquire a third acoustic information used for biometric matching of the user based on the first acoustic information and the second acoustic information.

According to another example aspect of the invention, provided is an information processing method including acquiring a first acoustic information obtained by receiving a sound wave emitted from a first sound source by the wearable device worn by a user, acquiring a second acoustic information obtained by receiving a sound wave emitted from a second sound source that is different from the first sound source by the wearable device, and acquiring a third acoustic information used for biometric matching of the user based on the first acoustic information and the second acoustic information.

According to another example aspect of the invention, provided is a storage medium storing a program that causes a computer to perform acquiring a first acoustic information obtained by receiving a sound wave emitted from a first sound source by the wearable device worn by a user, acquiring a second acoustic information obtained by receiving a sound wave emitted from a second sound source that is different from the first sound source by the wearable device, and acquiring a third acoustic information used for biometric matching of the user based on the first acoustic information and the second acoustic information.

DESCRIPTION OF EMBODIMENTS

Exemplary example embodiments of the disclosure will be described below with reference to the drawings. Throughout the drawings, the same components or corresponding components are labeled with same references, and the description thereof may be omitted or simplified.

First Example Embodiment

An information processing system according to the example embodiment will be described. The information processing system of the example embodiment is a system for performing a biometric matching by a wearable device such as an earphone.

Figure 1:
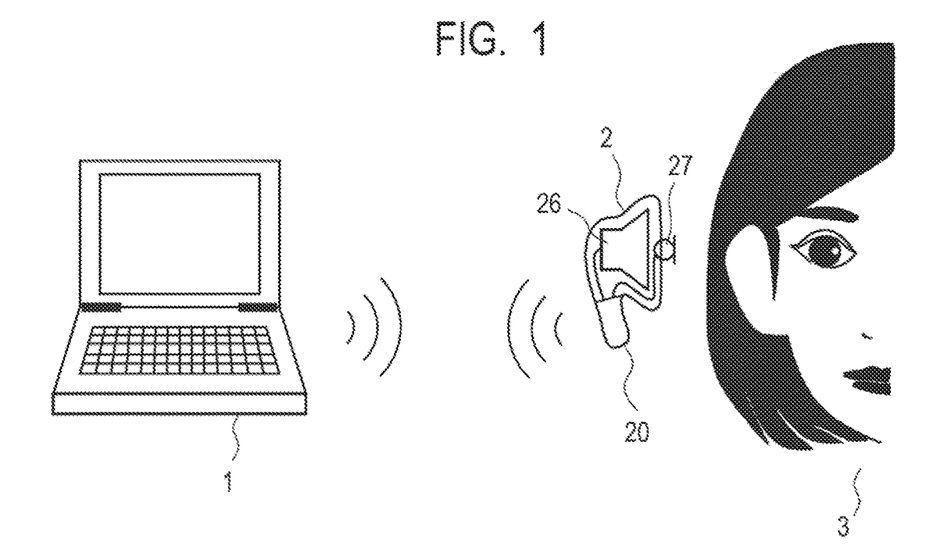
FIG. 1 is a schematic diagram illustrating a general configuration of an information processing system according to a first example embodiment.

FIG. 1 is a schematic diagram illustrating a general configuration of an information processing system according to the example embodiment. The information processing system is provided with an information communication device 1 and an earphone 2 which may be connected to each other by wireless communication.

The earphone 2 includes an earphone control device 20, a speaker 26, and a microphone 27. The earphone 2 is an acoustic device which can be worn on the ear of the user 3, and is typically a wireless earphone, a wireless headset or the like. The speaker 26 functions as a sound wave generation unit which emits a sound wave toward the ear canal of the user 3 when worn, and is arranged on the wearing surface side of the earphone 2. The microphone 27 is also arranged on the wearing surface side of the earphone 2 so as to receive sound waves echoed in the ear canal or the like of the user 3 when worn. The earphone control device 20 controls the speaker 26 and the microphone 27 and communicates with an information communication device 1.

Note that, in the specification, "sound" such as sound waves and voices includes inaudible sounds whose frequency or sound pressure level is outside the audible range.

The information communication device 1 is, for example, a computer that is communicatively connected to the earphone 2, and performs a biometric matching based on an acoustic information. The information communication device 1 further controls the operation of the earphone 2, transmits audio data for generating sound waves emitted from the earphone 2, and receives audio data acquired from the sound waves received by the earphone 2. As a specific example, when the user 3 listens to music using the earphone 2, the information communication device 1 transmits compressed data of music to the earphone 2. When the earphone 2 is a telephone device for business command at an event site, a hospital or the like, the information communication device 1 transmits audio data of the business instruction to the earphone 2. In this case, the audio data of the utterance of the user 3 may be transmitted from the earphone 2 to the information communication device 1.

Note that, the general configuration is an example, and for example, the information communication device 1 and the earphone 2 may be connected by wire. Further, the information communication device 1 and the earphone 2 may be configured as an integrated device, and further another device may be included in the information processing system.

Figure 2:
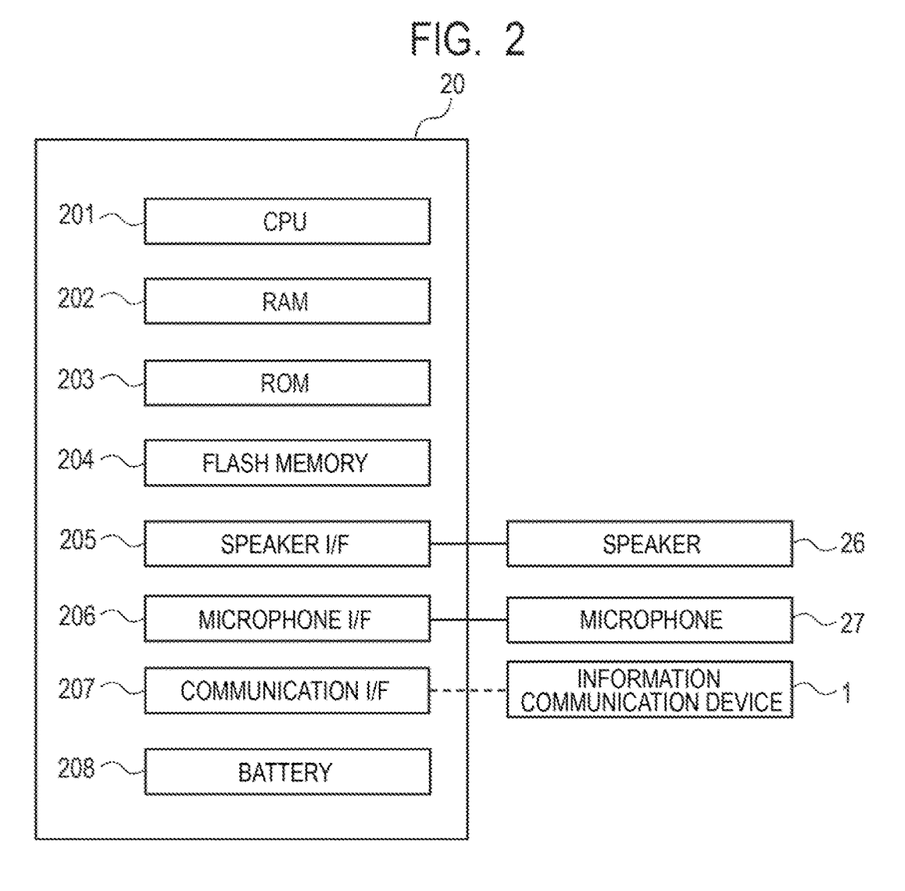
FIG. 2 is a block diagram illustrating a hardware configuration of an earphone according to the first example embodiment.

FIG. 2 is a block diagram illustrating a hardware configuration example of the earphone control device 20. The earphone control device 20 includes a central processing unit (CPU) 201, a random access memory (RAM) 202, a read only memory (ROM) 203, and a flash memory 204. The earphone control device 20 also includes a speaker interface (I/F) 205, a microphone I/F 206, a communication I/F 207, and a battery 208. Note that, each unit of the earphone control device 20 are connected to each other via a bus, wiring, a driving device, or the like (not shown).

The CPU 201 is a processor that has a function of performing a predetermined calculation according to a program stored in the ROM 203, the flash memory 204, or the like, and also controlling each unit of the earphone control device 20. The RAM 202 is composed of a volatile storage medium and provides a temporary memory area required for the operation of the CPU 201. The ROM 203 is composed of a non-volatile storage medium and stores necessary information such as a program used for the operation of the earphone control device 20. The flash memory 204 is a storage device configured from a non-volatile storage medium and temporarily storing data, storing an operation program of the earphone control device 20, or the like.

The communication I/F 207 is a communication interface based on standards such as Bluetooth (registered trademark) and Wi-Fi (registered trademark), and is a module for performing communication with the information communication device 1.

The speaker I/F 205 is an interface for driving the speaker 26. The speaker I/F 205 includes a digital-to-analog conversion circuit, an amplifier, or the like. The speaker I/F 205 converts the audio data into an analog signal and supplies the analog signal to the speaker 26. Thus, the speaker 26 emits sound waves based on the audio data.

The microphone I/F 206 is an interface for acquiring a signal from the microphone 27. The microphone I/F 206 includes an analog-to-digital conversion circuit, an amplifier, or the like. The microphone I/F 206 converts an analog signal generated by a sound wave received by the microphone 27 into a digital signal. Thus, the earphone control device 20 acquires audio data based on the received sound waves.

The battery 208 is, for example, a secondary battery, and supplies electric power required for the operation of the earphone 2. Thus, the earphone 2 can operate wirelessly without being connected to an external power source by wire.

Note that the hardware configuration illustrated in FIG. 2 is an example, and devices other than these may be added or some devices may not be provided. Further, some devices may be replaced with another device having similar functions. For example, the earphone 2 may further be provided with an input device such as a button so as to be able to receive an operation by the user 3, and further provided with a display device such as a display or an indicator lamp for providing information to the user 3. Thus, the hardware configuration illustrated in FIG. 2 can be appropriately changed.

Figure 3:
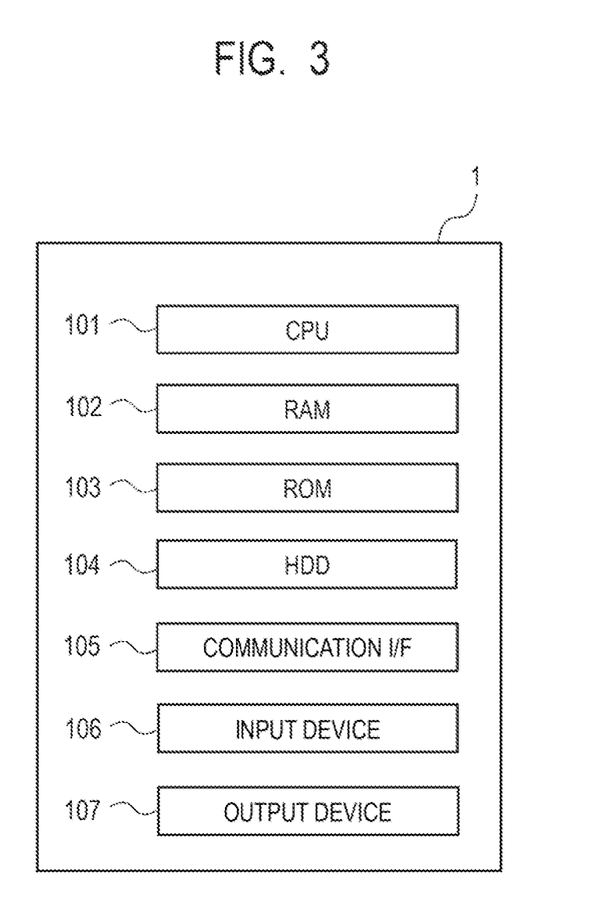
FIG. 3 is a block diagram illustrating a hardware configuration of an information communication device according to the first example embodiment.

FIG. 3 is a block diagram illustrating a hardware configuration example of the information communication device 1. The information communication device 1 includes a CPU 101, a RAM 102, a ROM 103, and a hard disk drive (HDD) 104. The information communication device 1 also includes a communication I/F 105, an input device 106, and an output device 107. Note that, each unit of the information communication device 1 is connected to each other via a bus, wiring, a driving device, or the like (not shown).

In FIG. 3, each unit constituting the information communication device 1 is illustrated as an integrated device, but some of these functions may be provided by an external device. For example, the input device 106 and the output device 107 may be external devices other than the unit constituting functions of a computer including the CPU 101 or the like.

The CPU 101 is a processor that has a function of performing a predetermined calculation according to a program stored in the ROM 103, the HDD 104, or the like, and also controlling each unit of the information communication device 1. The RAM 102 is composed of a volatile storage medium and provides a temporary memory area required for the operation of the CPU 101. The ROM 103 is composed of a non-volatile storage medium and stores necessary information such as a program used for the operation of the information communication device 1. The HDD 104 is a storage device configured from a non-volatile storage medium and temporarily storing data sent to and received from the earphone 2, storing an operation program of the information communication device 1, or the like.

The communication I/F 105 is a communication interface based on standards such as Bluetooth (registered trademark) and Wi-Fi (registered trademark), and is a module for performing communication with the other devices such as the earphone 2.

The input device 106 is a keyboard, a pointing device, or the like, and is used by the user 3 to operate the information communication device 1. Examples of the pointing device include a mouse, a trackball, a touch panel, and a pen tablet.

The output device 107 is, for example, a display device. The display device is a liquid crystal display, an organic light emitting diode (OLED) display, or the like, and is used for displaying information, graphical user interface (GUI) for operation input, or the like. The input device 106 and the output device 107 may be integrally formed as a touch panel.

Note that, the hardware configuration illustrated in FIG. 3 is an example, and devices other than these may be added or some devices may not be provided. Further, some devices may be replaced with other devices having similar functions. Further, some of the functions of the example embodiment may be provided by another device via a network, or the functions of the example embodiment may be realized by being distributed to a plurality of devices. For example, the HDD 104 may be replaced with a solid state drive (SSD) using a semiconductor memory, or may be replaced with a cloud storage. Thus, the hardware configuration illustrated in FIG. 3 can be appropriately changed.

Figure 4:
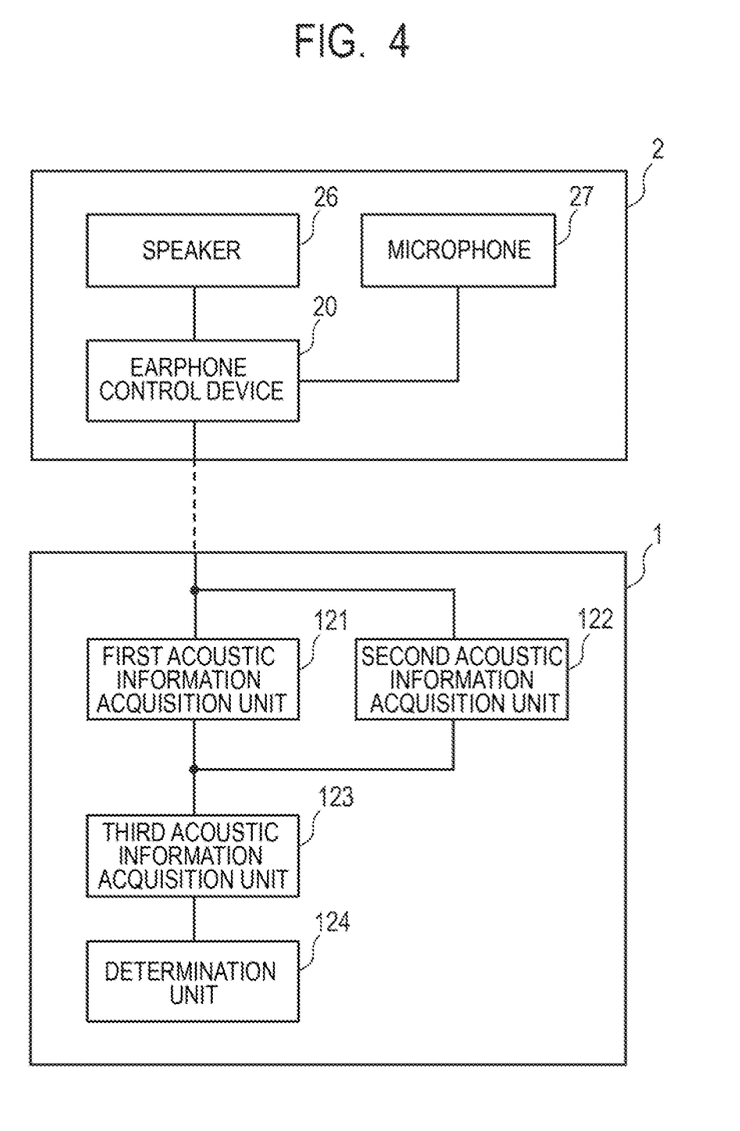
FIG. 4 is a functional block diagram of an earphone and an information communication device according to the first example embodiment.

FIG. 4 is a functional block diagram of the earphone 2 and the information communication device 1 according to the example embodiment. The information communication device 1 includes a first acoustic information acquisition unit 121, a second acoustic information acquisition unit 122, a third acoustic information acquisition unit 123, and a determination unit 124. Since the configuration of the earphone 2 is the same as that of FIG. 1, a description thereof will be omitted.

The CPU 101 performs predetermined arithmetic processing by loading programs stored in the ROM 103, the HDD 104 or the like into the RAM 102 and executing them. The CPU 101 controls each part of the information communication device 1 such as the communication I/F 105 based on the program. Thus, the CPU 201 realizes the functions of the first acoustic information acquisition unit 121, the second acoustic information acquisition unit 122, the third acoustic information acquisition unit 123, and the determination unit 124. Details of the specific processing performed by each functional block will be described later.

Note that, in FIG. 4, some or all of the functions of the functional blocks described in the information communication device 1 may be provided in the earphone control device 20 instead of the information communication device 1. That is, the above-described functions may be realized by the information communication device 1, may be realized by the earphone control device 20, or may be realized by cooperation between the information communication device 1 and the earphone control device 20. The information communication device 1 and the earphone control device 20 may be sometimes referred to as information processing devices more generally. In the following description, unless otherwise specified, it is assumed that each of the functional blocks about acquisition and determination of acoustic information is provided in the information communication device 1 as illustrated in FIG. 4.

Figure 5:
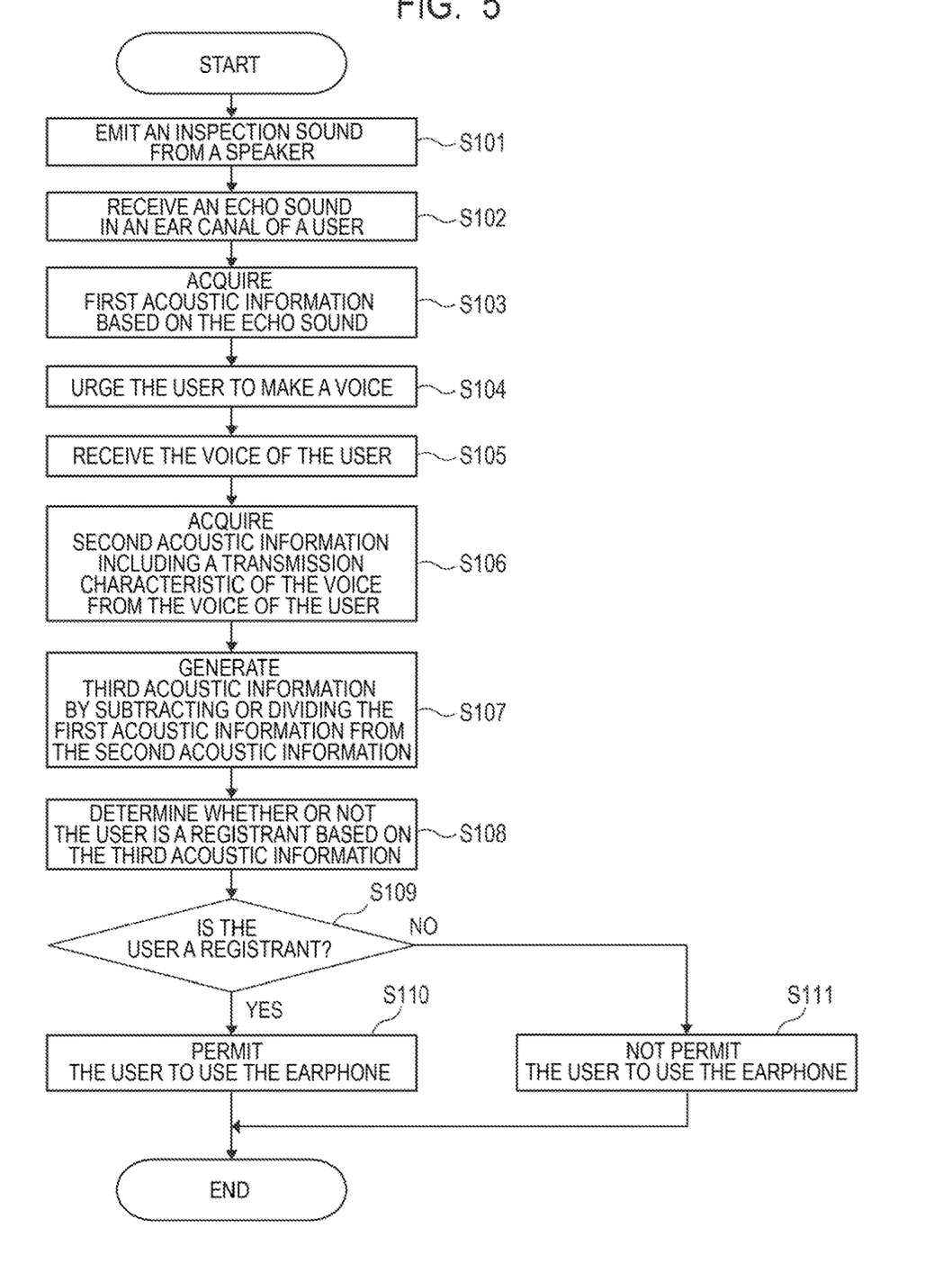
FIG. 5 is a flowchart illustrating a wearing determination process performed by the information communication device according to the first example embodiment.

FIG. 5 is a flowchart illustrating a biometric matching process performed by the information communication device 1 according to the example embodiment. The operation of the information communication device 1 will be described with reference to FIG. 5.

The biometric matching process of FIG. 5 is executed, for example, when the user 3 starts using the earphone 2 by operating the earphone 2. Alternatively, the biometric matching process of FIG. 5 may be executed every time a predetermined time elapses when the power of the earphone 2 is turned on.

In step S101, the first acoustic information acquisition unit 121 instructs the earphone control device 20 to emit an inspection sound. The earphone control device 20 transmits an inspection signal to a speaker 26, and the speaker 26 emits an inspection sound generated based on the inspection signal to an ear canal of a user 3. The speaker 26 may be referred to as a first sound source more generally.

In the processing to be described later, since arithmetic processing is performed between the acoustic information based on the echo sound of the inspection sound and the acoustic information based on the voice of the user 3, the frequency band of the inspection sound at least partially overlaps the frequency band of the voice of the user 3, that is, the frequency band of the audible sound.

In step S102, the microphone 27 receives the echo sound (ear acoustic sound) in the ear canal and converts it into an electrical signal. The microphone 27 transmits an electric signal based on the ear acoustic sound to an earphone control device 20, and the earphone control device 20 transmits the signal to the information communication device 1.

In step S103, the first acoustic information acquisition unit 121 acquires first acoustic information based on echo sound in the ear canal. The first acoustic information includes a transmission characteristic of the ear canal of the user 3. The acquired first acoustic information is stored in the HDD 104.

In step S104, the second acoustic information acquisition unit 122 instructs the earphone control device 20 to urge the user 3 to make a voice. An example of processing for urging the user 3 to make a voice will be described. The second acoustic information acquisition unit 122 generates notification information to urge the user 3 to make a voice. The notification information is audio information, for example, and information used for controlling the speaker 26 to emit a message voice such as "Please speak." or "Please say XXX (specific keyword)." through the earphone control device 20. In this way, the user 3 is notified of the message to urge utterance. If the information communication device 1 or the earphone 2 includes a display device that the user 3 can watch, the above message may be displayed on the display device. The reason for notifying the user to emit a specific keyword is to reduce the influence of a difference in frequency characteristics (formant) due to a difference in words emitted by the user 3.

In other words, the vocal cords, lungs, oral cavity, nasal cavity, or the like of the user 3 is a sound source for acquisition by the second acoustic information acquisition unit 122. Therefore, the sound emitting organ of the user 3 may be referred to as the second sound source more generally.

In step S105, the microphone 27 receives the sound based on the voice of the user 3 and converts it into an electric signal. The microphone 27 transmits the electric signal based on the voice of a user 3 to the earphone control device 20, and the earphone control device 20 transmits the signal to the information communication device 1.

In step S106, the second acoustic information acquisition unit 122 acquires second acoustic information based on the voice of the user 3. The first acoustic information includes a transmission characteristic of the voice from the sound emitting organ of the user 3 to the earphone 2 and a frequency characteristic (voiceprint) of the voice of the user 3. The acquired second acoustic information is stored in the HDD 104. Note that, the order of acquisition of the first acoustic information in steps S101 to S103 and the order of acquisition of the second acoustic information in steps S104 to S106 may be reversed, and at least a part of them may be performed in parallel.

In step S107, the third acoustic information acquisition unit 123 reads the first acoustic information and the second acoustic information from the HDD 104, and generates the third acoustic information based on them. This processing may be to subtract or divide the first acoustic information from the second acoustic information. Alternatively, this processing may be to subtract or divide the second acoustic information from the first acoustic information. In other words, the third acoustic information is generated and acquired by subtracting or dividing one of the first acoustic information and the second acoustic information from the other. The third acoustic information is used for the biometric matching of the user 3.

In step S108, the determination unit 124 determines whether or not the user 3 is a registrant by matching the third acoustic information including the biological information of the user 3 against the biological information of the registrant previously recorded in the HDD 104. If it is determined that the user 3 is the registrant (YES in step S109), the process proceeds to step S110. If it is determined that the user 3 is not the registrant (NO in step S109), the process proceeds to step S111.

In step S110, the information communication device 1 transmits a control signal indicating that the use of the earphone 2 by the user 3 is permitted to the earphone 2. Thus, the earphone 2 becomes a permission state by the user 3.

In step S111, the information communication device 1 transmits a control signal indicating that the use of the earphone 2 by the user 3 is not permitted to the earphone 2. Thus, the earphone 2 becomes a non-permission state by the user 3. The non-permission state may be, for example, a state in which no sound is emitted from the speaker 26 of the earphone 2. Note that, the control in steps S110 and S111 does not control the earphone 2 side but may control the information communication device 1 side. For example, the communication connection between the information communication device 1 and the earphone 2 may be different to switch between the permission state and the non-permission state.

The inspection sound generated by the speaker 26 in step S101 will be described in more detail with specific examples. As an example of the inspection signal used for generating the inspection sound, a signal including a predetermined range of frequency components such as a chirp signal, a maximum length sequence (M-sequence signal), or white noise may be used. Thus, the frequency range of the inspection sound can be used for the wearing determination.

Figure 6:
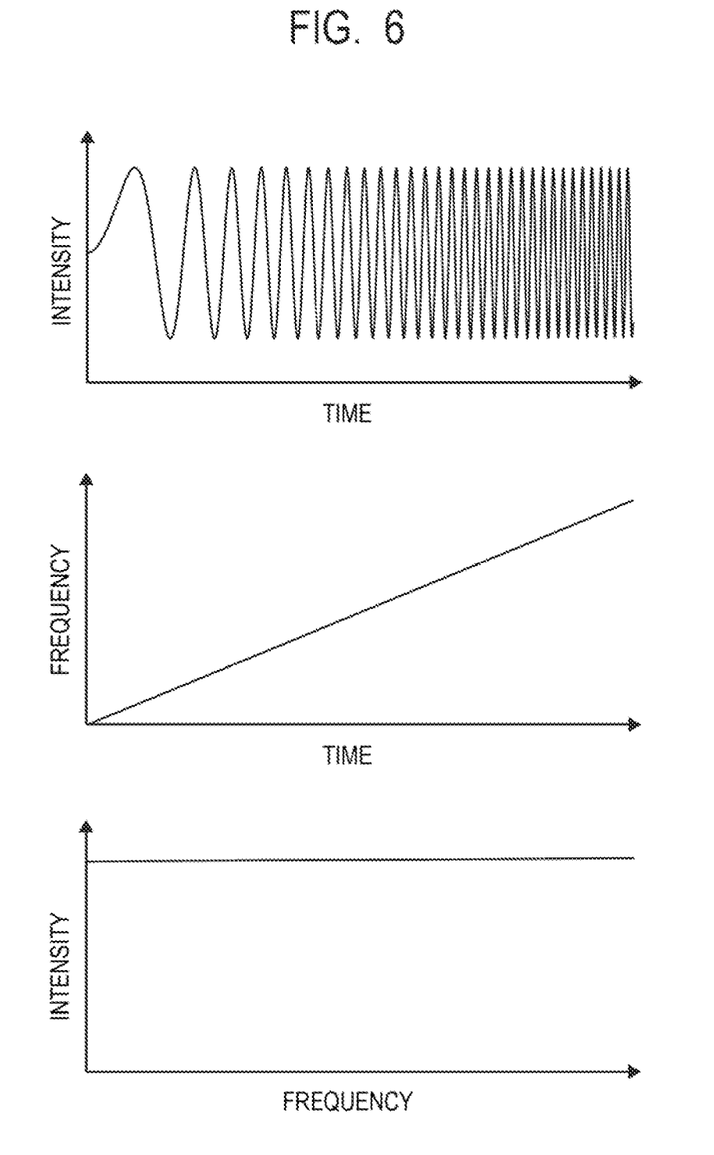
FIG. 6 is a graph showing a characteristic of a chirp signal.

FIG. 6 is a graph showing characteristics of the chirp signal. FIG. 6 shows the relationship between intensity and time, the relationship between frequency and time, and the relationship between intensity and frequency, respectively. A chirp signal is a signal whose frequency continuously changes with time. FIG. 6 shows an example of a chirp signal in which the frequency increases linearly with time.

Figure 7:
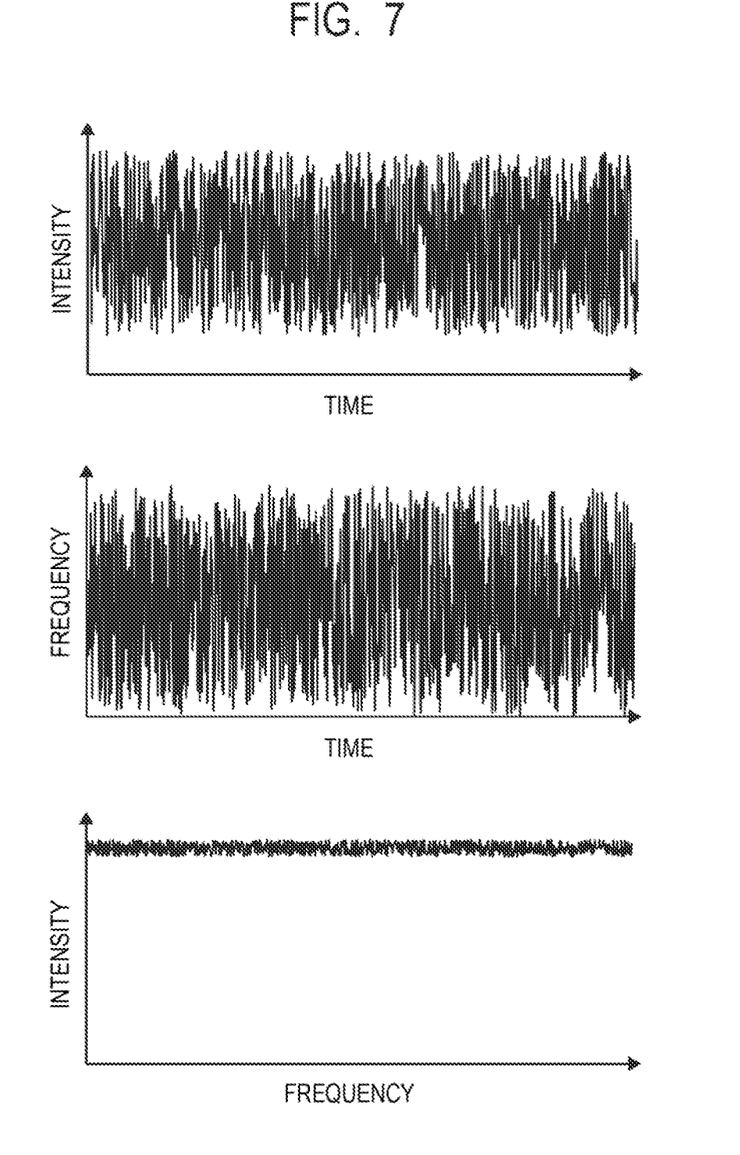
FIG. 7 is a graph showing a characteristic of an M-sequence signal or a white noise.

FIG. 7 is a graph showing characteristics of an M-sequence signal or white noise. Since the M-sequence signal generates a pseudo noise close to white noise, the characteristics of the M-sequence signal and the white noise are substantially the same. FIG. 7, like FIG. 6, shows the relationship between intensity and time, the relationship between frequency and time, and the relationship between intensity and frequency. As shown in FIG. 7, the M-sequence signal or white noise is a signal that evenly includes signals of a wide range of frequency.

The chirp signal, the M-sequence signal, or the white noise has a frequency characteristic in which the frequency changes over a wide range. Therefore, by using these signals as inspection sounds, it is possible to obtain echo sound including a wide range of a frequency component in subsequent step S102.

The process of generating the third acoustic information in step S107 will be described in more detail with a specific example. The signal acquired by the first acoustic information acquisition unit 121 (first acoustic information) can be expressed by the following Equation (1).

[Math. 1]

$$Y_{s_1,w_1} = G_{w_1} C_{s_1} X \qquad (1)$$

Here, X is a function representing the frequency spectrum of the inspection sound emitted from the speaker 26 to the ear canal. $Y_{si,wj}$ is a function representing the frequency spectrum of the echo sound obtained by the microphone 27. These frequency spectra are obtained, for example, by converting input/output signals in time sequences into frequency domains by Fourier transformation. $s_i$ (i=1, 2, ... ) is an argument representing a person of a matching target, and since $s_1$ is used in Equation (1), the Equation (1) is about the first user. $w_j$ (j=1, 2, ... ) is an argument representing the wearing state of the earphone 2, and Equation (1) is an equation about the first wearing state since $w_1$ is used.

$C_{si}$ is a function of the frequency domain representing a transmission characteristic of the i-th user's ear acoustic sound. Since the shape of the ear canal is unique to each person, $C_{si}$ is a function different from one user to another. In other words, $C_{si}$ is biological information that may be used to identify a person. $G_{wj}$ is a function of the frequency domain representing a change in the transmission characteristic due to a difference in the wearing state. Since $G_{wj}$ changes to a different function each time earphone 2 is worn again, it may act as a noise to $C_{si}$. The echo sound obtained by the microphone 27 includes a mixture of the transmission characteristics of the ear acoustic sound and changes in the transmission characteristics depending on the wearing state, and in Equation (1), these can be separated into the form of the product of $C_{si}$ and $G_{wj}$.

The signal acquired by the second acoustic information acquisition unit 122 (second acoustic information) can be expressed by the following Equation (2).

[Math. 2]

$$Y_{s_1,w_1,n_1,t} = G_{w_1} C_{s_1} U_{n_1,t} \quad (2)$$

Here, $U_{nk,t}$ is a function indicating the frequency spectrum of the voice emitted by the user 3. $V_{si,wj,nk,t}$ is a function representing the frequency spectrum of the sound acquired by the microphone 27. These frequency spectra are obtained, for example, by converting input/output signals in time sequences into frequency domains by Fourier transformation. The $n_k$ (k=1, 2, ... ) is an argument representing various situations included in the voice, such as the contents of the utterance and the characteristics of the voiceprint depending on the speaker. Equation (1) is for the first situation because $n_1$ is used. t (where t is a real number) is an argument indicating the time. When a user 3 generates a sentence or phrase, a frequency spectrum changes according to time. For example, when the user 3 utters "ABC", the frequency spectrum at the moment when the user utters "A" is different from the frequency spectrum at the moment when the user utters "B". Also, even when the user 3 utters the same word in multiple times, the frequency spectrum may differ depending on the time. Thus, time t may also be an argument necessary to specify the frequency spectrum of the voice. $D_{si}$ is a function of a frequency domain indicating the transmission characteristic of the i-th user's voice. Since the voiceprint is unique to the user, $U_{nk,t}$ is a function different depending on the user. Since transmission characteristic of the voice depends on the shape of the user's skull, oral cavity, or the like, $D_{si}$ is also a function different from one user to another. In other words, $U_{nk,t}$ and $D_{si}$ are biological information that may be used to identify a person. In Equation (2), $G_{wj}$ is common to Equation (1). This is because when the user 3 wears the earphone 2 and then acquires the first acoustic information and the second acoustic information in the same wearing state without putting on and taking off the earphone 2, $G_{wi}$ indicating the wearing state is in the same state.

Here, an operation for converting both sides into logarithms is performed for Equation (1) and Equation (2). These equations are converted into the following Equation (3) and Equation (4), respectively. In Equation (3) and Equation (4), the expression of the value of the base of the logarithm is omitted, but the value of the base is optional.

[Math. 3]

$$\log Y_{s_1,w_1} = \log G_{w_1} + \log C_{s_1} + \log X \quad (3)$$

[Math. 4]

$$\log V_{s_1,w_1,n_1,t} = \log G_{w_1} + \log D_{s_1} + \log U_{n_1,t} \quad (4)$$

When Equation (3) is subtracted from Equation (4), the term $\log G_{w1}$ common to both sides is canceled, and the following Equation (5) is obtained.

[Math. 5]

$$\log V_{s_1,w_1,n_1,t} - \log Y_{s_1,w_1} - \log X = \log D_{s_1} - \log C_{s_1} + \log U_{n_1,t} \quad (5)$$

The terms on the left side are observation signals or known signals acquired by the microphone 27. The terms of the right side are different functions depending on a user and may be used as biological information. Since the right side is equal to the left side from Equation (5), biological information can be calculated from the observation signal.

In this way, the left side of Equation (5) is calculated from the first acoustic information represented by Equation (1) and the second acoustic information represented by Equation (2) by the above-described calculation, and can be used as the third acoustic information for the biometric matching. As can be understood from Equation (5), the third acoustic information does not include a term $G_{wj}$ indicating the effect of the difference in the wearing state. Therefore, the third acoustic information is robust against noise due to the wearing state. Therefore, the accuracy of the biometric matching is improved by using the third acoustic information for the biometric matching.

In the above example, conversion to logarithm is performed for convenience of calculation, but it is not necessary. When the conversion to logarithm is not performed, the operation for subtracting the Equation (3) from the Equation (4) is replaced with the operation for dividing the Equation (3) from the Equation (4).

In the above example, in order to perform addition and subtraction between the first acoustic information and the second acoustic information, typically, the frequency band of the first acoustic information and the frequency band of the second acoustic information at least partially overlap. When the second acoustic information is based on the voice of the user 3, the first acoustic information includes the frequency band of the audible sound included in the voice of the user 3.

The determination process in step S108 will be described in detail with reference to a specific example using a feature amount extraction technique. The determination unit 124 calculates a feature amount by a predetermined algorithm from frequency characteristics included in the third acoustic information. Thereafter, the determination unit 124 compares the feature amount of the third acoustic information with the feature amount of the registrant extracted by the similar technique to calculate a matching score indicating the similarity between the feature amounts. When there is a plurality of registrants, the same processing is performed for each of the plurality of registrants. The determination unit 124 determines whether or not the user 3 is a registrant based on whether or not the matching score exceeds a predetermined threshold. When there is a plurality of registrants, if the matching score exceeds a predetermined threshold for any one of the plurality of registrants, it is determined that the user 3 is a registrant.

As described above, according to the example embodiment, the accuracy of the biometric matching is improved by generating the third acoustic information used for the biometric matching by using the first acoustic information and the second acoustic information based on different sound sources each other. Therefore, an information processing device capable of improving the accuracy of a biometric matching using acoustic information acquired by a wearable device is provided.

Second Example Embodiment

The information processing system of the example embodiment is different from the first example embodiment in the content of a process for determining whether or not a user is a registrant. In the following, differences from the first example embodiment will be mainly described, and the description of the common parts will be omitted or simplified.

Figure 8:
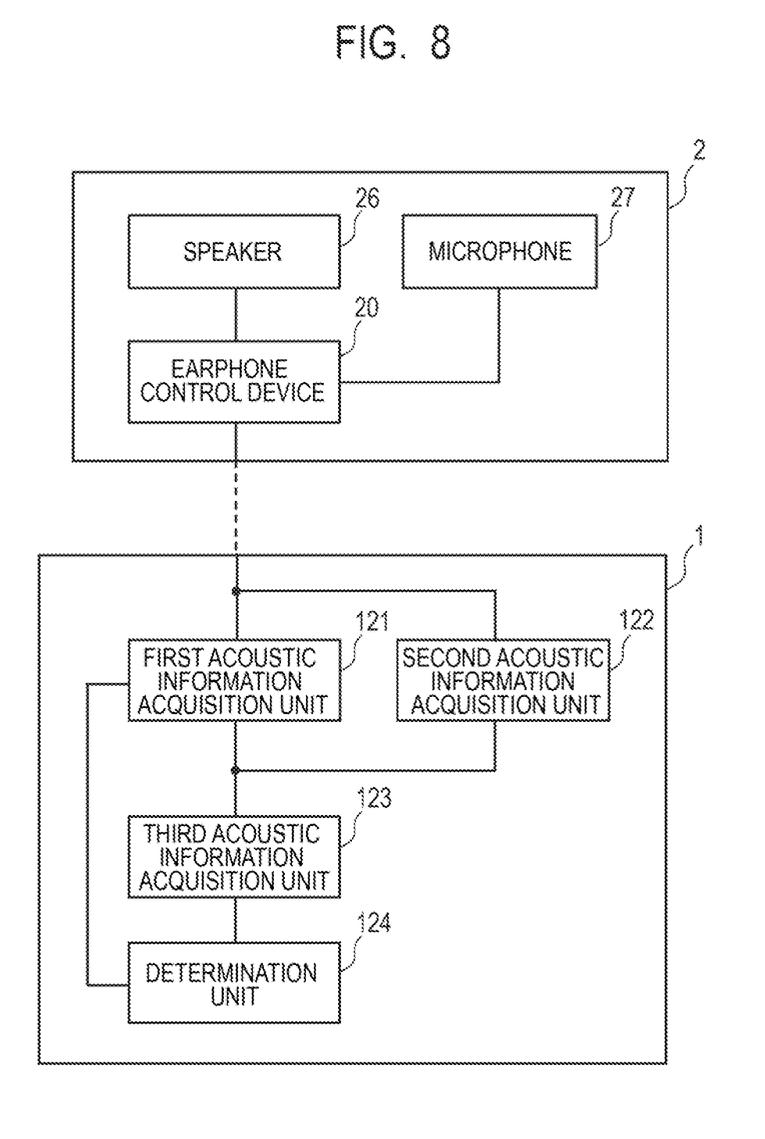
FIG. 8 is a functional block diagram of an earphone and an information communication device according to a second example embodiment.

FIG. 8 is a functional block diagram of the earphone 2 and the information communication device 1 according to the example embodiment. The example embodiment differs from the first example embodiment in that the determination unit 124 further uses not only the third acoustic information acquired by the third acoustic information acquisition unit 123 but also the first acoustic information acquired by the first acoustic information acquisition unit 121 to make a determination.

Figure 9:
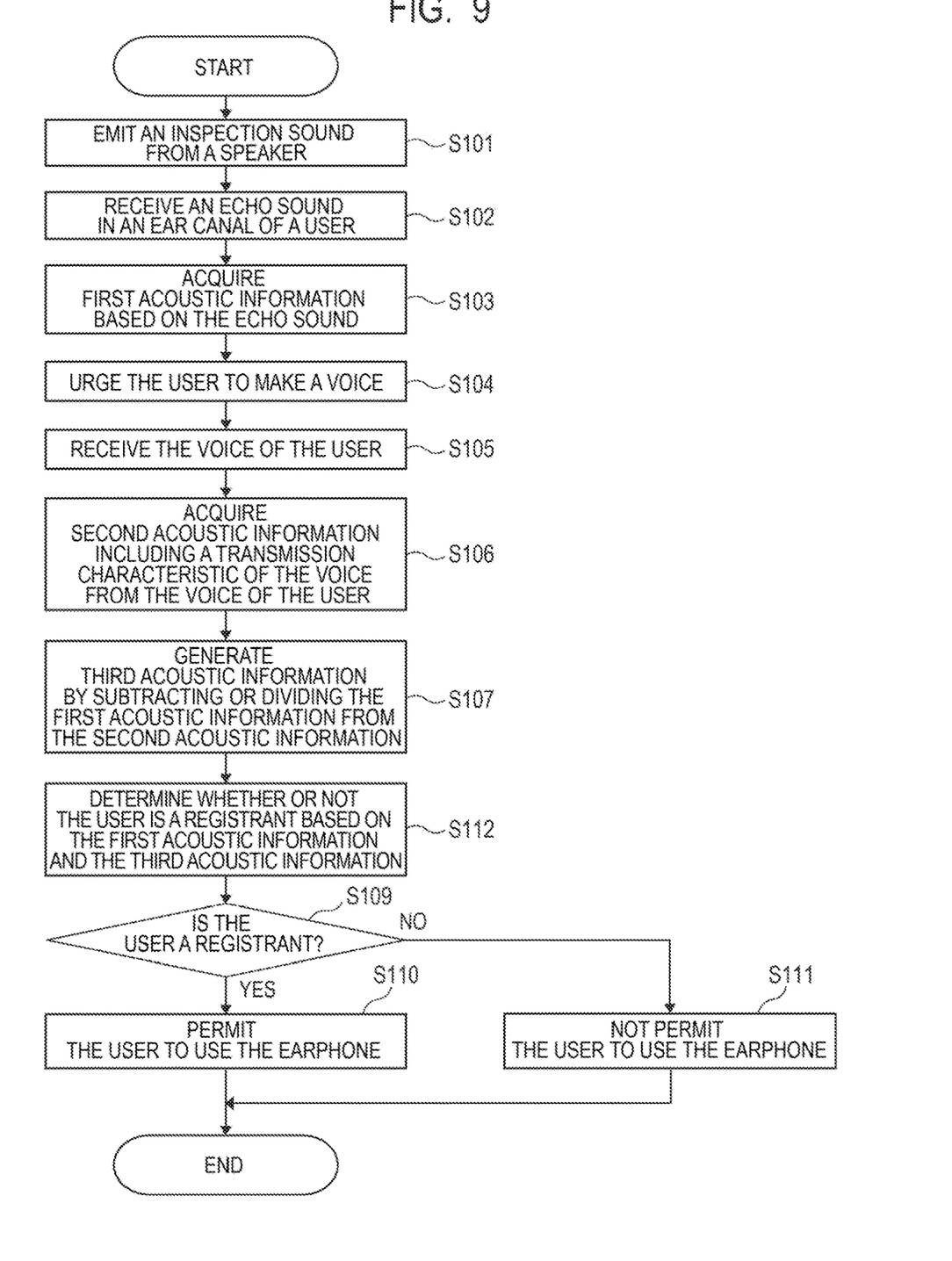
FIG. 9 is a flowchart illustrating a wearing determination process performed by the information communication device according to the second example embodiment.

FIG. 9 is a flowchart illustrating a biometric matching process according to example embodiment performed by the information communication device 1. Since the difference with first example embodiment is only that step S108 is replaced with step S112, step S112 will be described here.

In step S112, the determination unit 124 determines whether or not the user 3 is the registrant by matching information obtained by integrating the first acoustic information and the third acoustic information against biological information of the registrant previously recorded in the HDD 104. If it is determined that the user 3 is the registrant (YES in step S109), the process proceeds to step S110. If it is determined that the user 3 is not the registrant (NO in step S109), the process proceeds to step S111.

The integration of the first acoustic information and the third acoustic information in step S112 will be described in more detail. The first acoustic information is information mainly based on the ear acoustic sound of the user 3, and the third acoustic information is information obtained by performing arithmetic processing of the ear acoustic sound of the user 3 and the sound of the voice each other. Therefore, the first acoustic information and the third acoustic information include different biological information. In general, performing a two-factor matching using two different kinds of biological information improves the accuracy of the matching. Therefore, in the example embodiment, the first acoustic information and the third acoustic information are integrated in step S112, and the two-factor matching is performed by using the integrated result. Thus, the matching accuracy can be further improved.

A specific example of integration of acoustic information will be described. Assume a case in which, as described in the first example embodiment, a technique is used in the matching in the determination unit 124 for extracting feature amounts from the acoustic information and calculating a matching score indicating the similarity of the feature amounts. In this case, the determination unit 124 calculates a first matching score based on the first acoustic information and a second matching score based on the third acoustic information. Thereafter, the determination unit 124 calculates a third matching score obtained by combining the first matching score and the second matching score by addition, averaging, linear combination, multiplication, or the like. Thereafter, the determination unit 124 determines whether or not the user 3 is a registrant based on whether or not the third matching score exceeds a predetermined threshold. By using this technique, a two-factor matching for integrating and using a plurality of kinds of biological information is realized, and matching accuracy is further improved.

If the matching is based on the first acoustic information and the third acoustic information, a technique other than the above-described technique may be used. For example, the technique may be that the first matching based on the first acoustic information and the second matching based on the third acoustic information may be performed, and then the logical product or logical sum of the result of the first matching and the result of the second matching may be used as the final matching result to perform the determination. In addition, when the result of the first matching is different from the result of the second matching, the matching result that the judgment is impossible may be output.

In general, it is known that higher matching accuracy can be obtained with the matching method using the ear acoustic sound than with the matching method using the frequency characteristic of the voice (voiceprint). Therefore, the acoustic information added to the third acoustic information as described above is preferably the first acoustic information including information mainly based on the ear acoustic sound of the user 3. However, in a case where sufficient accuracy can be obtained by the matching method using the voiceprint, the second acoustic information and the third acoustic information may be integrated by using the second acoustic information instead of the first acoustic information.

As yet another example, the first acoustic information, the second acoustic information, and the third acoustic information may be integrated. In this case, since the matching in which more acoustic information is considered is realized, the matching accuracy is further improved.

Third Example Embodiment

The information processing system of the example embodiment is different from the first example embodiment in that it has a function of a noise cancellation. In the following, the difference from first example embodiment will be mainly described, and the description of the common parts will be omitted or simplified.

Figure 10:
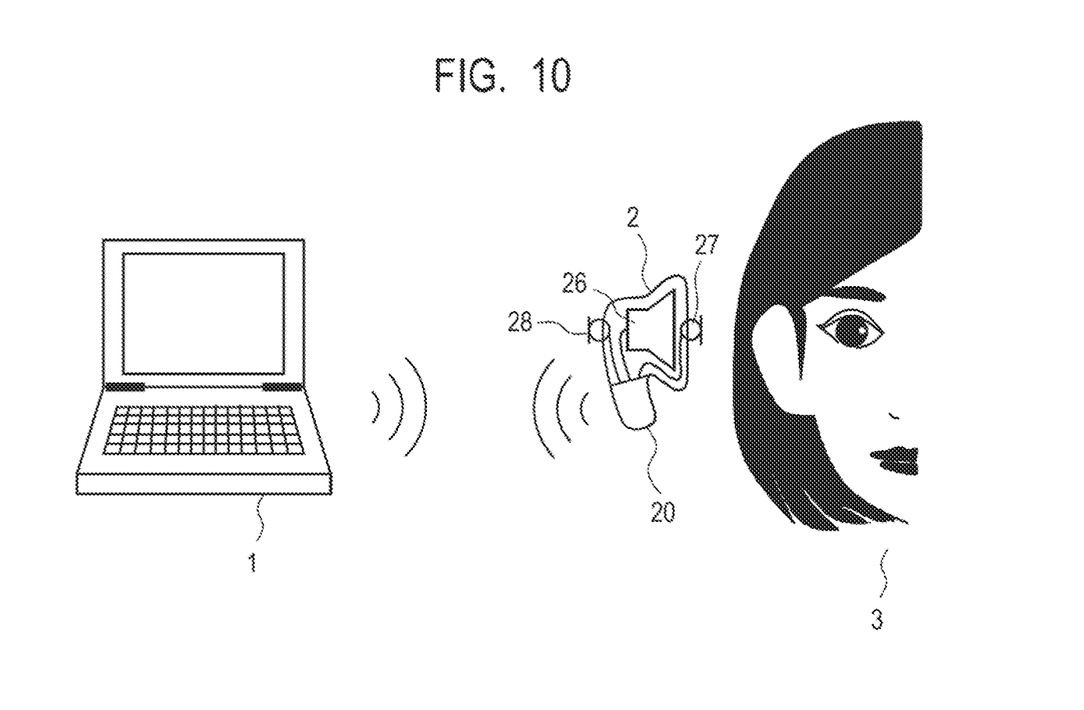
FIG. 10 is a schematic diagram illustrating a general configuration of an information processing system according to a third example embodiment.

FIG. 10 is a schematic diagram illustrating the general configuration of an information processing system according to the example embodiment. In the example embodiment, an earphone 2 includes a plurality of microphones 27 and 28 arranged at different positions each other. The microphone 28 is controlled by an earphone control device 20. The microphone 28 is arranged on the back side opposite to the wearing surface of the earphone 2 so as to receive sound waves from the outside when the microphone is worn.

In the acquisition of the first acoustic information or the second acoustic information, the external sound may be noise. Therefore, in the example embodiment, a plurality of microphones 27 and 28 are arranged in the earphone 2, and the earphone 2 has a function of reducing the influence of external environmental sound by performing noise cancellation using the sound acquired by the microphone 28. Here, the environmental sound includes not only the sound generated in the outside of the user 3 but also the sound which may be noise in the matching such as the sound echoed in the outside among the sounds emitted by the user 3 or the speaker 26. The microphone 27 and the microphone 28 are sometimes referred to as a first microphone and a second microphone, respectively.

Noise cancellation will be described. The environmental sound is incident on the microphones 27 and 28 with almost the same phase. Therefore, at least a part of the environmental sound can be canceled by superimposing the sound obtained by the microphone 27 on the sound obtained by the microphone 28 in reversed phase. Since the intensity of the sound received by the microphones 27 and 28 may be different from each other due to attenuation by the housing of the earphone 2 or the like, one or both sounds may be amplified or attenuated before being superimposed.

The processing for superimposing the sound in the reversed phase may be signal processing performed digitally on the obtained audio data or may be performed as analog process by emitting the sound by the speaker 26 in the reversed phase to the sound obtained by the microphone 28.

The system described in the above example embodiment can also be configured as in the following fourth example embodiment.

Fourth Example Embodiment

Figure 11:
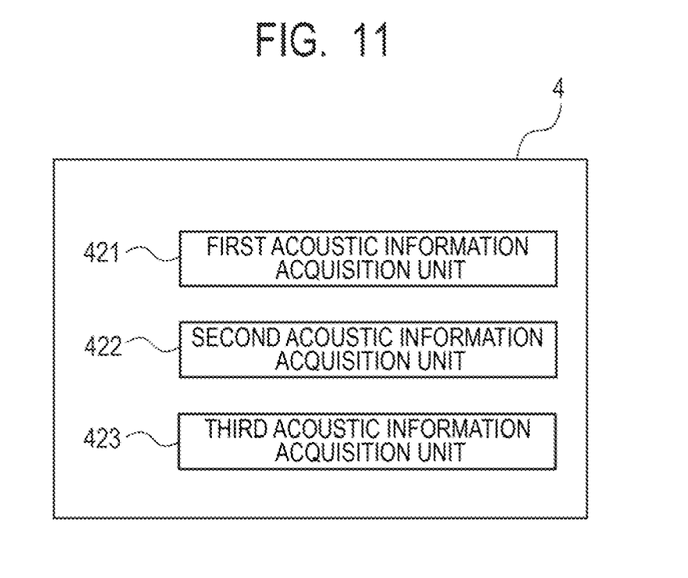
FIG. 11 is a functional block diagram of an information communication device according to a fourth example embodiment.

FIG. 11 is a functional block diagram of the information processing device 4 according to the fourth example embodiment. The information processing device 4 includes a first acoustic information acquisition unit 421, a second acoustic information acquisition unit 422, and a third acoustic information acquisition unit 423. The first acoustic information acquisition unit 421 acquires a first acoustic information obtained by receiving a sound wave emitted from a first sound source by a wearable device worn by a user. The second acoustic information acquisition unit 422 acquires a second acoustic information obtained by receiving a sound wave emitted from a second sound source that is different from the first sound source by the wearable device. The third acoustic information acquisition unit 423 acquires a third acoustic information used for biometric matching of the user based on the first acoustic information and the second acoustic information.

According to the example embodiment, there is provided an information processing device 4 capable of improving the accuracy of the biometric matching using the acoustic information acquired by the wearable device.

Modified Example Embodiments

The disclosure is not limited to the example embodiments described above, and may be suitably modified within the scope of the disclosure. For example, an example in which a part of the configuration of one embodiment is added to another embodiment or an example in which a part of the configuration of another embodiment is replaced is also an example embodiment of the disclosure.

In the above example embodiment, although the earphone 2 is exemplified as an example of a wearable device, the disclosure is not limited to a device worn on the ear as long as acoustic information necessary for processing can be acquired. For example, the wearable device may be a bone conduction type acoustic device.

In the example embodiment described above, it is assumed that the second acoustic information is obtained by receiving the voice emitted by the user 3, but the disclosure is not limited thereto. That is, the second sound source for generating the sound wave for acquiring the second acoustic information may be other than the voice emitting organ of the user 3. For example, when a second speaker different from the speaker 26 is separately provided in the earphone 2 or another device, the second speaker may be a second sound source. When the wearable device is a pair of earphones worn on both ears of the user 3, for example, the earphone of the right ear may be an earphone 2 having the function of the ear acoustic sound matching described in the first to third example embodiment, and the earphone of the left ear may be an earphone having the second speaker described above. In this example, by emitting a sound wave for acquiring the second acoustic information from the second speaker in the left ear and receiving the sound wave by the microphone 27 in the right ear, the same processing as the first to third example embodiment can be performed. In the first to third example embodiment, the frequency usable for using the voice is limited to the range of the voice that the human can emit, but in this example, since the voice is not used, there is no such restriction, and it is possible to use a non-audible sound having a frequency such as an ultrasonic band, for example. By using the non-audible sound, the sound wave for the matching can be made difficult to be perceived by the user 3, and comfort in use is improved.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself. Further, one or two or more components included in the example embodiments described above may be a circuit such as an application specific integrated circuit (ASIC)), a field programmable gate array (FPGA), or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

Further, a service implemented by the function of each of the example embodiments described above may be provided to a user in a form of software as a service (SaaS).

It should be noted that the above-described embodiments are merely examples of embodying the disclosure, and the technical scope of the disclosure should not be limitedly interpreted by these. That is, the disclosure can be implemented in various forms without departing from the technical idea or the main features thereof.

The whole or part of the example embodiments disclosed above can be described as, but not limited to, the following supplementary notes.

(Supplementary Note 1)

An information processing device comprising:
  a first acoustic information acquisition unit configured to acquire a first acoustic information obtained by receiving a sound wave emitted from a first sound source by a wearable device worn by a user;
  a second acoustic information acquisition unit configured to acquire a second acoustic information obtained by receiving a sound wave emitted from a second sound source that is different from the first sound source by the wearable device; and
  a third acoustic information acquisition unit configured to acquire a third acoustic information used for biometric matching of the user based on the first acoustic information and the second acoustic information.

(Supplementary Note 2)

The information processing device according to supplementary note 1, wherein the first acoustic information includes a transmission characteristic of an ear canal of the user.

(Supplementary Note 3)

The information processing device according to supplementary 1 or 2, wherein the first sound source is a speaker provided in the wearable device.

(Supplementary Note 4)

The information processing device according to any one of supplementary notes 1 to 3, wherein the wearable device is an earphone worn on an ear of the user.

(Supplementary note 5)

The information processing device according to any one of supplementary notes 1 to 4, wherein the second acoustic information includes a transmission characteristic of a voice emitted by the user.

(Supplementary Note 6)

The information processing device according to any one of supplementary notes 1 to 5, wherein the second sound source is a sound emitting organ of the user.

(Supplementary Note 7)

The information processing device according to any one of supplementary notes 1 to 4,
  wherein the first sound source is a speaker provided in the wearable device worn on an ear of the user, and
  wherein a second sound source is a speaker provided in the wearable device or another wearable device worn on the other ear of the user.

(Supplementary Note 8)

The information processing device according to any one of supplementary notes 1 to 7, wherein the third acoustic information acquisition unit generates and acquires the third acoustic information by subtracting or dividing one of the first acoustic information and the second acoustic information from the other.

(Supplementary Note 9)

The information processing device according to any one of supplementary notes 1 to 8, wherein a frequency band of the first acoustic information and a frequency band of the second acoustic information at least partially overlap.

(Supplementary Note 10)

The information processing device according to any one of supplementary notes 1 to 9 further comprising a determination unit configured to determine whether the user is a registrant or not based on the third acoustic information.

(Supplementary Note 11)

The information processing device according to any one of supplementary notes 1 to 9 further comprising a determination unit configured to determine whether the user is a registrant or not based on the third acoustic information and at least one of the first acoustic information and the second acoustic information.

(Supplementary Note 12)

The information processing device according to any one of supplementary notes 1 to 11,
  wherein the wearable device includes a first microphone and a second microphone arranged at different positions each other, and
  wherein at least one of the first acoustic information acquisition unit and the second acoustic information acquisition unit acquires an acoustic information in which at least a part of an environmental sound is canceled based on a sound wave received by the first microphone and a sound wave received by the second microphone.

(Supplementary Note 13)

A wearable device comprising:
  a first acoustic information acquisition unit configured to acquire a first acoustic information obtained by receiving a sound wave emitted from a first sound source by the wearable device worn by a user;
  a second acoustic information acquisition unit configured to acquire a second acoustic information obtained by receiving a sound wave emitted from a second sound source that is different from the first sound source by the wearable device; and
  a third acoustic information acquisition unit configured to acquire a third acoustic information used for biometric matching of the user based on the first acoustic information and the second acoustic information.

(Supplementary Note 14)

An information processing method comprising:
  acquiring a first acoustic information obtained by receiving a sound wave emitted from a first sound source by the wearable device worn by a user;
  acquiring a second acoustic information obtained by receiving a sound wave emitted from a second sound source that is different from the first sound source by the wearable device; and
  acquiring a third acoustic information used for biometric matching of the user based on the first acoustic information and the second acoustic information.

(Supplementary Note 15)

A storage medium storing a program that causes a computer to perform:
  acquiring a first acoustic information obtained by receiving a sound wave emitted from a first sound source by the wearable device worn by a user;
  acquiring a second acoustic information obtained by receiving a sound wave emitted from a second sound source that is different from the first sound source by the wearable device; and
  acquiring a third acoustic information used for biometric matching of the user based on the first acoustic information and the second acoustic information.

This application is based upon and claims the benefit of priority from Japanese Patent Application No. 2019-004003, filed on Jan. 15, 2019, the disclosure of which is incorporated herein in its entirety by reference.

REFERENCE SIGNS LIST

1 information communication device
2 earphone
3 user
4 information processing device
20 earphone control device
26 speaker
27, 28 microphone
101, 201 CPU
102, 202 RAM
103, 203 ROM
104 HDD
105, 207 communication I/F
106 input device
107 output device
121, 421 first acoustic information acquisition unit
122, 422 second acoustic information acquisition unit
123, 423 third acoustic information acquisition unit
124 determination unit
204 flash memory
205 speaker I/F 206 microphone I/F
208 battery

What is claimed is:

1. An information processing device comprising:
a memory configured to store instructions; and
a processor configured to execute the instructions to:
acquire a first acoustic information obtained by receiving an echo sound, the echo sound being a sound wave emitted from a first sound source and echoed back in an ear canal of a user, by a wearable device worn by the user;
acquire a second acoustic information obtained by receiving a sound wave emitted from a second sound source that is different from the first sound source by the wearable device;
acquire a third acoustic information used for biometric matching of the user based on the first acoustic information and the second acoustic information; and
determine whether the user is a registrant or not based on the third acoustic information and at least one selected from a group of the first acoustic information and the second acoustic information.

2. The information processing device according to claim 1, wherein the first acoustic information includes a transmission characteristic of an ear canal of the user.

3. The information processing device according to claim 1, wherein the first sound source is a speaker provided in the wearable device.

4. The information processing device according to claim 1, wherein the wearable device is an earphone worn on an ear of the user.

5. The information processing device according to claim 1, wherein the second acoustic information includes a transmission characteristic of a voice emitted by the user.

6. The information processing device according to claim 1, wherein the second sound source is a sound emitting organ of the user.

7. The information processing device according to claim 1,
wherein the first sound source is a speaker provided in the wearable device worn on an ear of the user, and
wherein a second sound source is a speaker provided in the wearable device or another wearable device worn on the other ear of the user.

8. The information processing device according to claim 1, wherein the third acoustic information is generated and acquired by subtracting or dividing one of the first acoustic information and the second acoustic information from the other.

9. The information processing device according to claim 1, wherein a frequency band of the first acoustic information and a frequency band of the second acoustic information at least partially overlap.

10. The information processing device according to claim 1, wherein the processor is further configured to execute the instructions to determine whether the user is a registrant or not based on the third acoustic information.

11. The information processing device according to claim 1,
wherein the wearable device includes a first microphone and a second microphone arranged at different positions each other, and
wherein an acoustic information in which at least a part of an environmental sound is canceled based on a sound wave received by the first microphone and a sound wave received by the second microphone is acquired.

12. A wearable device comprising:
a memory configured to store instructions; and
a processor configured to execute the instructions to:
acquire a first acoustic information obtained by receiving an echo sound, the echo sound being a sound wave emitted from a first sound source and echoed back in an ear canal of a user, by the wearable device worn by the user;
acquire a second acoustic information obtained by receiving a sound wave emitted from a second sound source that is different from the first sound source by the wearable device;
acquire a third acoustic information used for biometric matching of the user based on the first acoustic information and the second acoustic information; and
determine whether the user is a registrant or not based on the third acoustic information and at least one selected from a group of the first acoustic information and the second acoustic information.

13. An information processing method comprising:
acquiring a first acoustic information obtained by receiving an echo sound, the echo sound being a sound wave emitted from a first sound source and echoed back in an ear canal of a user, by the wearable device worn by the user;
acquiring a second acoustic information obtained by receiving a sound wave emitted from a second sound source that is different from the first sound source by the wearable device;
acquiring a third acoustic information used for biometric matching of the user based on the first acoustic information and the second acoustic information; and
determining whether the user is a registrant or not based on the third acoustic information and at least one selected from a group of the first acoustic information and the second acoustic information.

14. A non-transitory storage medium storing a program that causes a computer to perform:
acquiring a first acoustic information obtained by receiving an echo sound, the echo sound being a sound wave emitted from a first sound source and echoed back in an ear canal of a user, by the wearable device worn by the user;
acquiring a second acoustic information obtained by receiving a sound wave emitted from a second sound source that is different from the first sound source by the wearable device;
acquiring a third acoustic information used for biometric matching of the user based on the first acoustic information and the second acoustic information; and
determining whether the user is a registrant or not based on the third acoustic information and at least one selected from a group of the first acoustic information and the second acoustic information.

* * * * *